(No Model.)
J. A. TORRENCE & D. B. JERNIGAN.
CULTIVATOR.
No. 316,313. Patented Apr. 21, 1885.
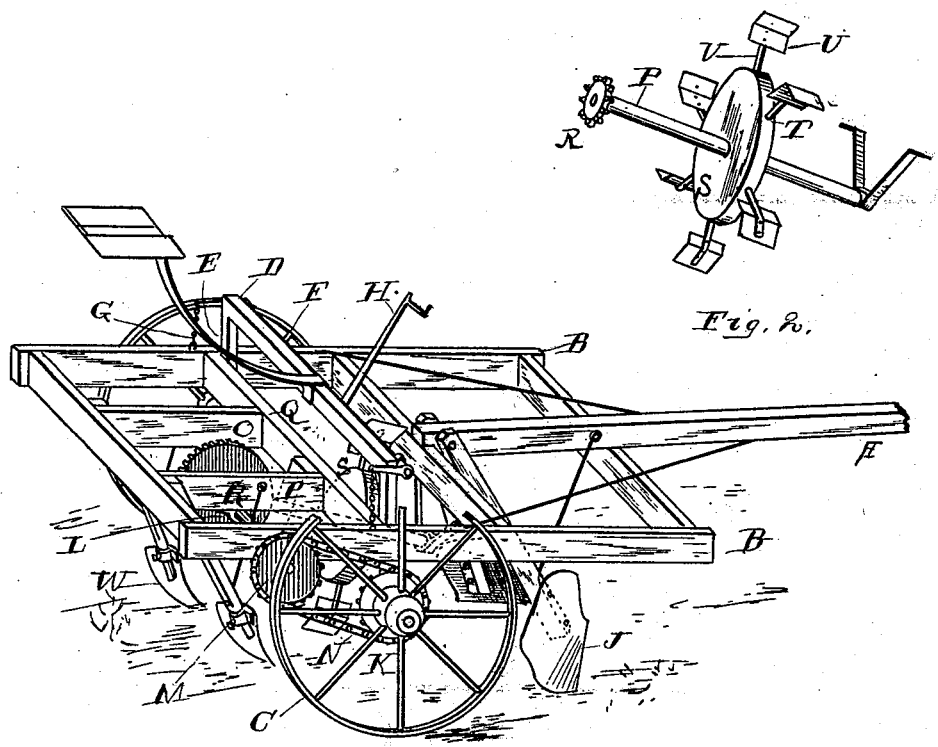

UNITED STATES PATENT OFFICE.

JOHN A. TORRENCE AND DAVID B. JERNIGAN, OF HARRISON, ARKANSAS.

CULTIVATOR.

SPECIFICATION forming part of Letters Patent No. 316,313, dated April 21, 1885.

Application filed October 31, 1884. (No model.)

*To all whom it may concern:*

Be it known that we, JOHN A. TORRENCE and DAVID B. JERNIGAN, of Harrison, in the county of Boone and State of Arkansas, have invented a new and useful Improvement in Cultivators, which improvement is fully set forth in the following specification and accompanying drawings, in which—

Figure 1 is a perspective view of our improved cultivator. Fig. 2 is an enlarged perspective view of the revolving hoes detached.

This invention relates to cultivators which are especially designed for working cotton and cane crops; and it consists in combining cultivating devices, hereinafter explained, with a vertically-adjustable transporting-frame suspended from an arched axle by means of chains, as will be hereinafter explained.

In the accompanying drawings, A is the pole, and B the frame-work, of an ordinary cultivator. Laterally beneath the frame we provide suitable wheels, C, journaled to and connected together by means of a yoke, D, extending inwardly from the hub of each wheel, and thence upwardly on the inside of the frame B, and thence connecting transversely some distance above the frame. The vertical part E of the yoke is designed to move in ways on the inner side of the frame, so that the said frame B may be raised and lowered by means of a transverse rod, F, journaled on the upper part of the yoke and attached to the frame by chains G, and manipulated by a vertical lever, H, within the reach of the driver. A seat, I, is secured to the horizontal part of the yoke rearwardly from the lever H. At the forward part of the machine a pair of scrapers, J, are placed, and secured by means of shanks to the pole A, and designed to cut away the outer part of the row. On the inner side of one of the wheels C we provided a sprocket-wheel, K, and rearwardly upon the transverse shaft L a corresponding sprocket-wheel, M, communicating with each other by means of a chain, N. The shaft L extends inwardly, and has on its inner end a bevel-wheel, O, and at right angles with the shaft L a longitudinal shaft, P, journaled beneath transverse beams Q, and provided rearwardly with a bevel-wheel, R, meshing in the wheel O. Upon the shaft P we provide a wheel, S, secured thereon, the periphery of which is provided with a series of openings, T. A series of shovels, U, provided with shanks V, are inserted in these said openings T, and secured in position by means of wedges or set-screws, as found most desirable. The outer ends of the shovels U are inclined forward somewhat at a right angle, forming a cutting-edge. Immediately in the rear of the revolving shovels or hoes are placed shovel-plows W, on each side of the row, to be used in cultivating the row, and provided with set-screws for adjusting vertically, as found desirable.

In operating the device the frame-work carrying the scrapers, revolving shovels, &c., is lowered until the said scrapers and shovels penetrate the soil to a sufficient depth, and may be held in position by any suitable device, or lowered and elevated by means of the foot pressing against the lever H, to correspond with the irregularities of the soil.

A sufficient number of shovels are designed to be placed upon the wheel S, and geared in any suitable manner corresponding with the forward movement of the machine, so that the said shovels may, after cutting out a portion of the row, leave a part of it to form a hill. The shovels may be of any width found convenient. We prefer them to be about a foot wide.

What we claim is—

In a cultivator, the combination of a draft-frame which is suspended by chains from the arched axle of two transporting-wheels, the rod F, the lever H, scrapers J, sprocket-wheels O R, wheel S, hoes V, and plows, all constructed and adapted to operate substantially as and for the purposes described.

In testimony that we claim the foregoing we have hereunto set our hands, this 24th day of September, 1884, in the presence of witnesses.

JOHN A. TORRENCE.
DAVID B. JERNIGAN.

Witnesses:
LEONIDAS KIRBY,
HENRY C. KING.